July 29, 1930. D. A. RICE 1,771,447
POTATO HARVESTER
Filed May 28, 1928 5 Sheets-Sheet 3
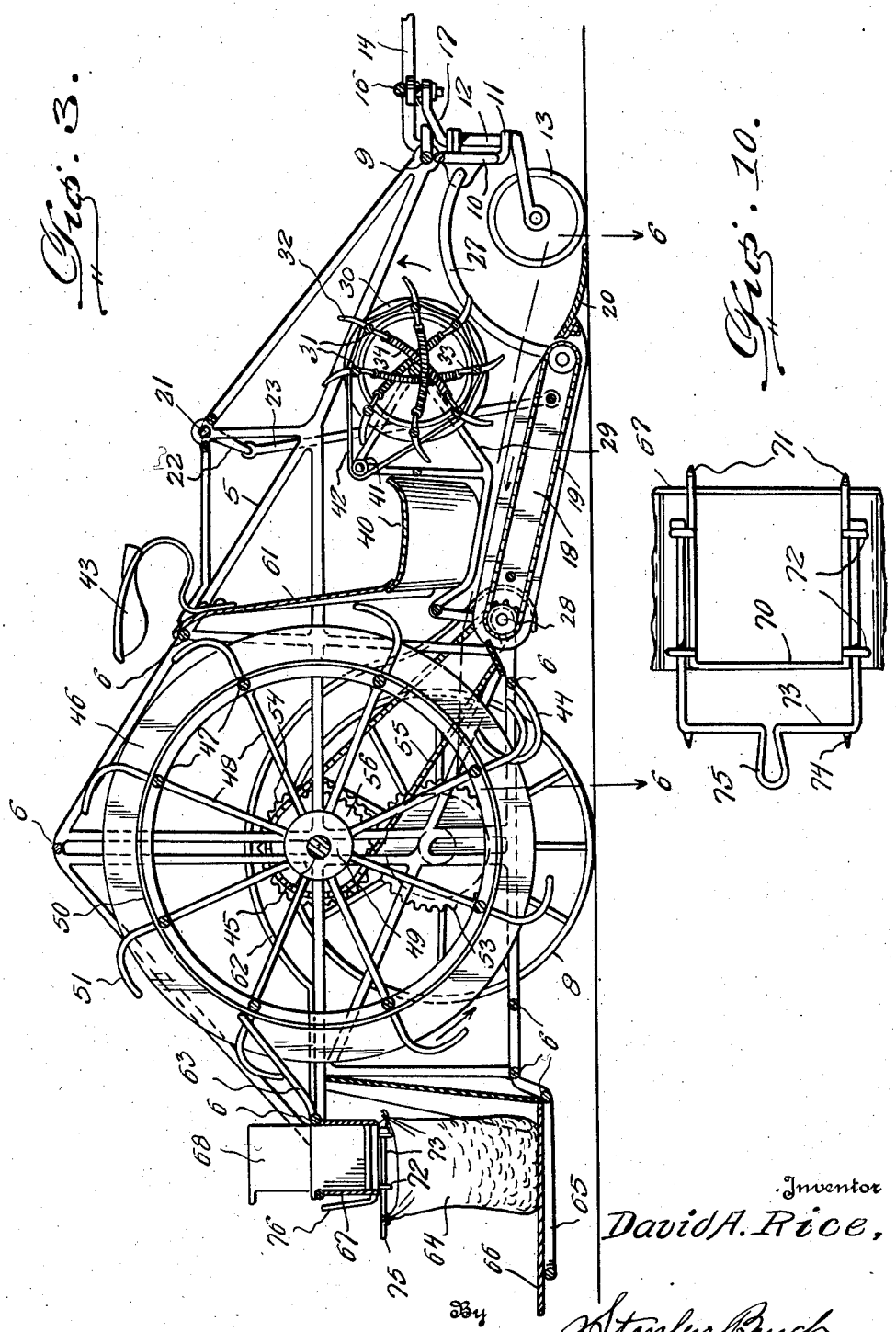
Inventor
David A. Rice,
By J. Stanley Burch
Attorney

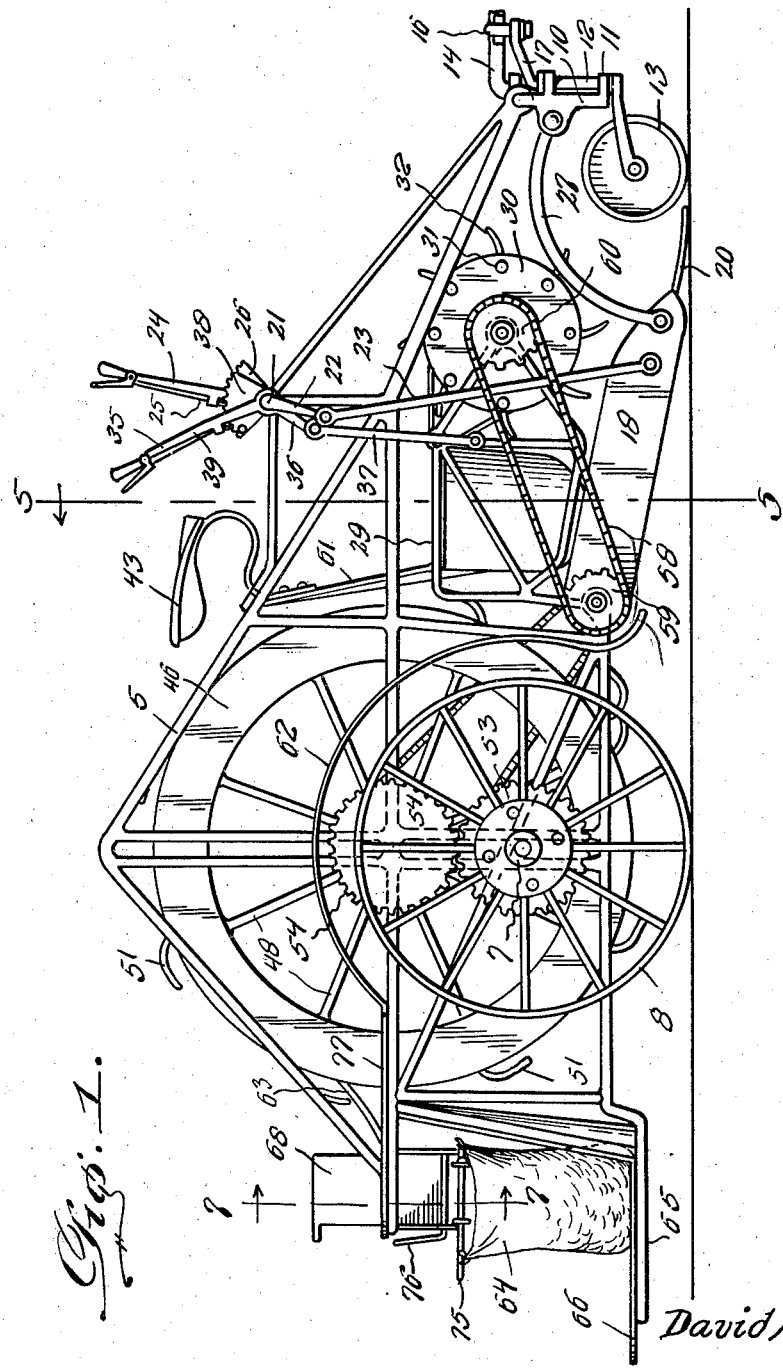

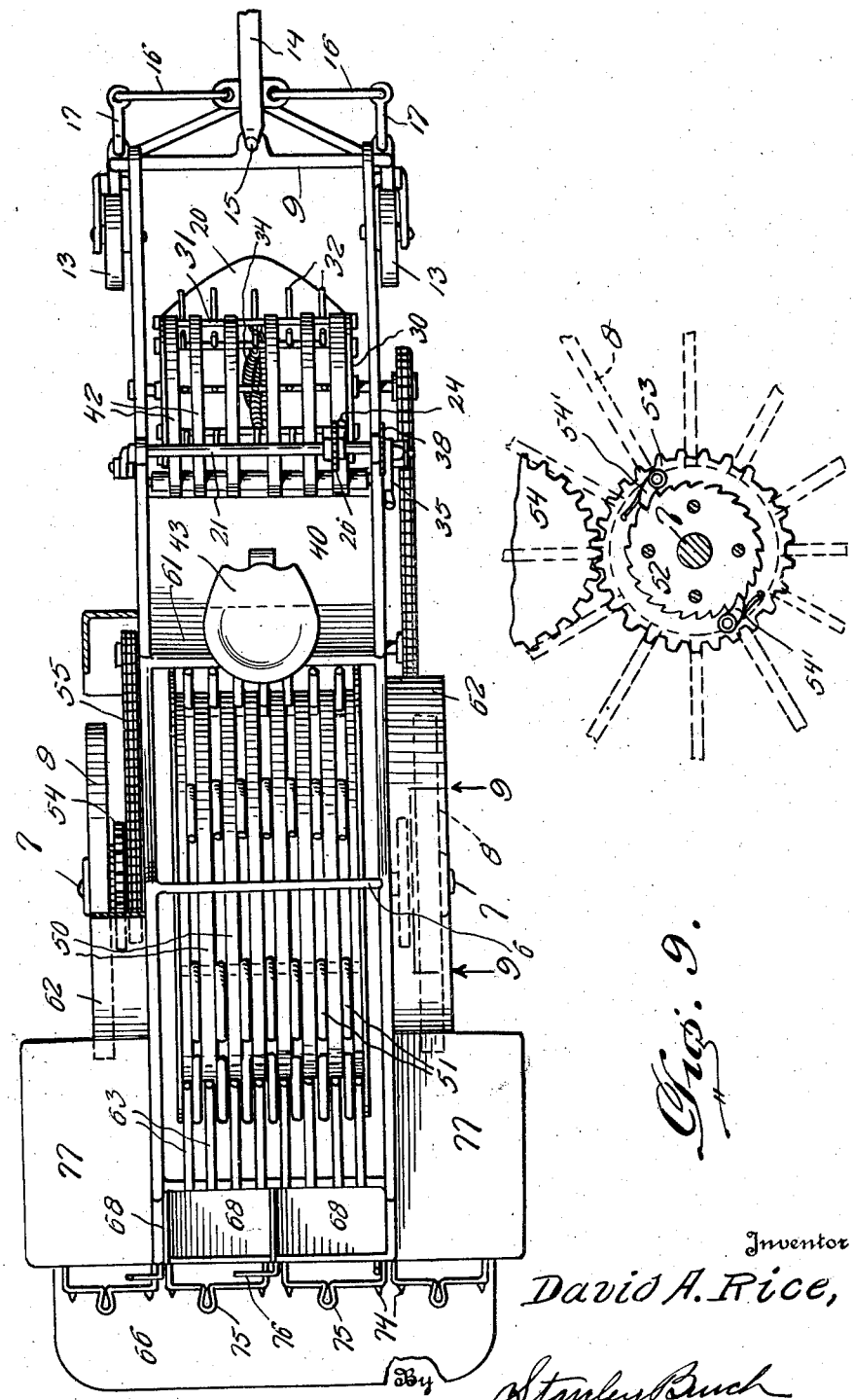

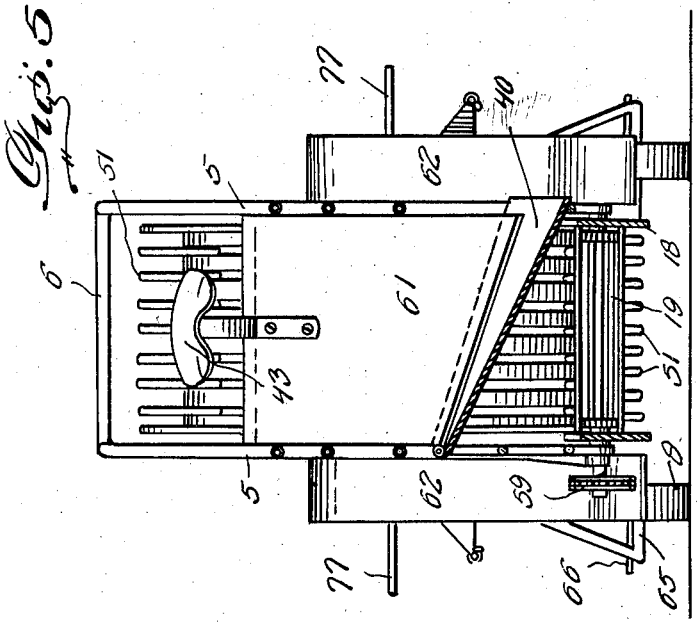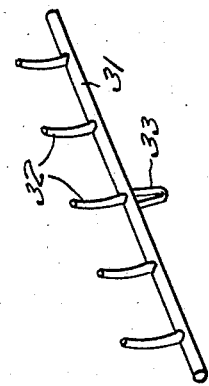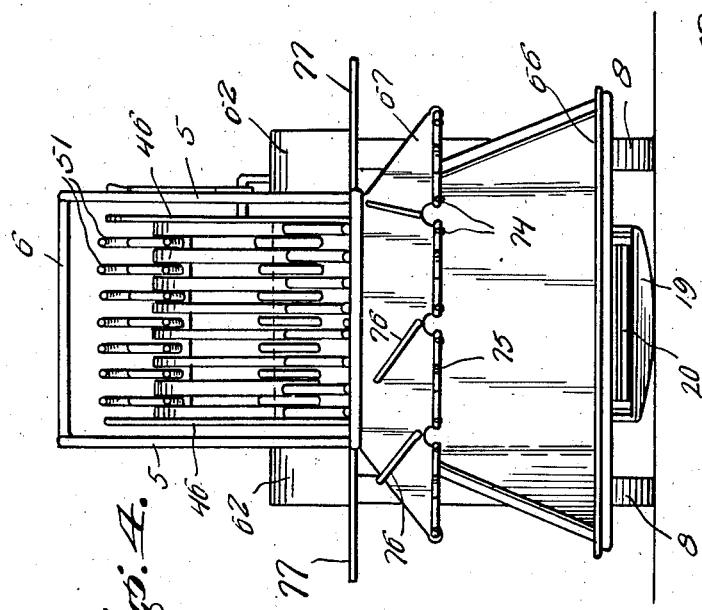

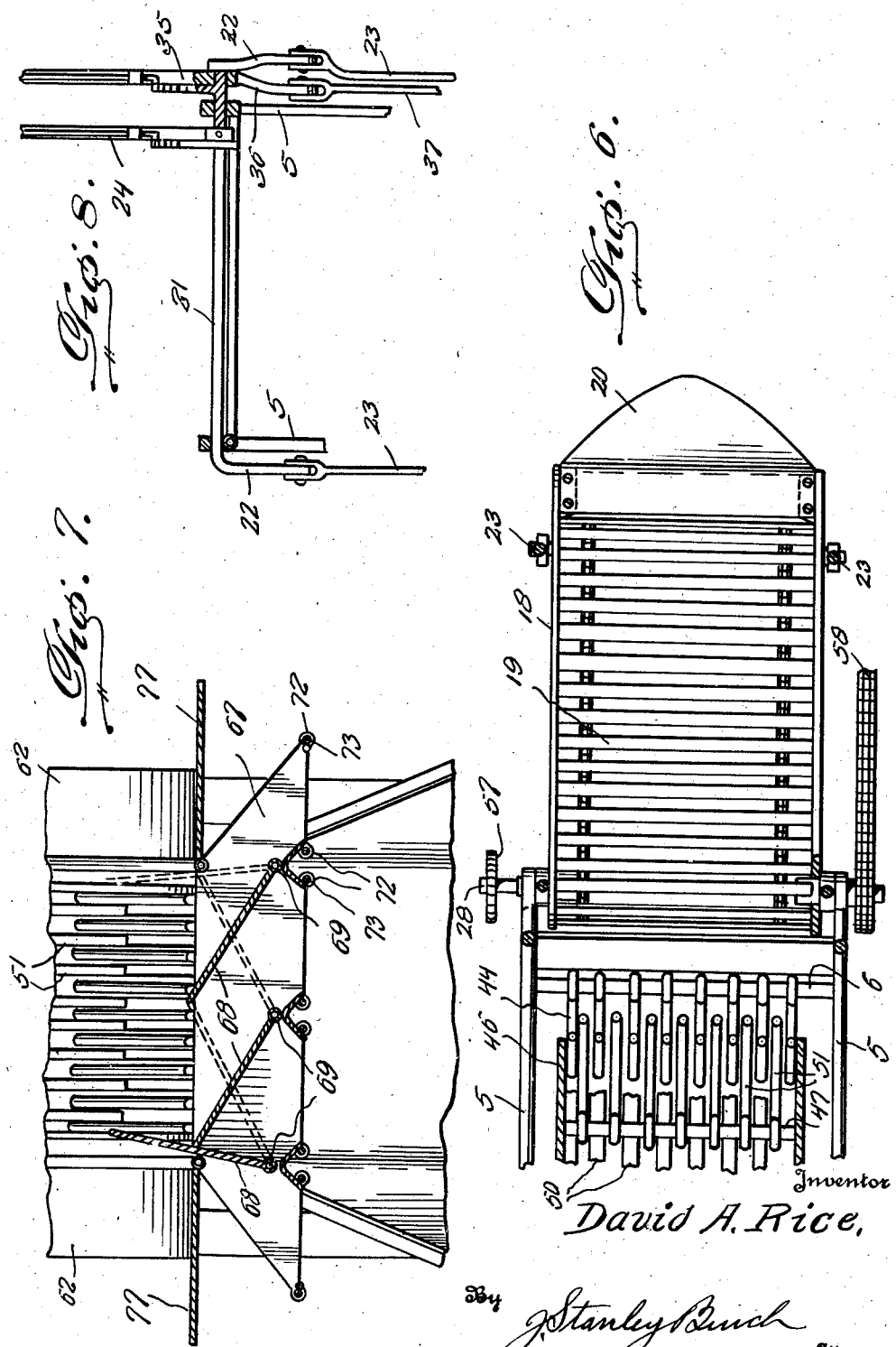

Patented July 29, 1930

1,771,447

UNITED STATES PATENT OFFICE

DAVID A. RICE, OF ST. ANTHONY, IDAHO

POTATO HARVESTER

Application filed May 28, 1928. Serial No. 281,172.

This invention relates to improvements in potato harvesters in the use of which the potatoes are continuously dug from the earth, separated from earth and other foreign material, and delivered into sacks.

An object of the invention is to provide a potato harvester of the above kind having extremely efficient means for conveying the potatoes from the plow or digging implement and delivering them to the sacks, which means insures thorough sifting of dirt or earth from the potatoes before the latter are delivered into the sacks.

Another object is to provide efficient means for freeing the tops from the potatoes as they are dug from the earth, and for delivering the tops onto the ground at one side of the machine.

Still another object is to provide a potato harvester having cooperating mechanisms so constructed and related as to insure extremely reliable operation and meet with all of the requirements for a successful commercial use.

The invention consists in the novel form, combination and arrangement of parts hereinafter more fully described, shown in the accompanying drawings and claimed.

In the drawings:—

Figure 1 is a side elevational view of a potato harvester embodying the present invention.

Figure 2 is a top plan view thereof, partly broken away and in section.

Figure 3 is a substantially central longitudinal section of the same.

Figure 4 is a rear elevational view of the harvester.

Figure 5 is a transverse vertical section on line 5—5 of Figure 1.

Figure 6 is an enlarged fragmentary horizontal section on line 6—6 of Figure 3.

Figure 7 is an enlarged fragmentary vertical transverse section on line 7—7 of Figure 1.

Figure 8 is an enlarged fragmentary view, partly in elevation and partly in transverse vertical section, showing details of the means for raising and lowering the plow and elevating conveyor and the potato topper.

Figure 9 is an enlarged fragmentary section showing details of the means for actuating the moving parts from the ground wheels, the section being taken on line 9—9 of Figure 2 with parts omitted.

Figure 10 is an enlarged fragmentary bottom plan view, showing one of the sack holders; and Figure 11 is an enlarged perspective view of one of the finger-carrying rock shafts of the potato topper.

Referring more in detail to the drawings, the present harvesting machine includes a main frame embodying side members 5 connected by cross bars 6. Rigid with and projecting laterally from the rear portion of the main frame are stub axles 7 upon which are journaled rear ground wheels 8, and supporting the front end of the main frame is a wheeled truck including a cross bar 9 journaled in the front ends of the side frame members 5 and having depending braced ends 10 provided with bearings 11 in which are journaled the posts 12 of trailer steering and supporting wheels 13. A draft tongue 14 has its rear end pivoted as at 15 to the cross bar 9 for horizontal swinging movement, and links 16 connect the tongues 14 forwardly of the pivot 15 with forwardly projecting crank arms 17 provided on the upper ends of the posts 12. In this way the draft tongue steers the wheels 13.

Hinged at its rear end in the lower forward portion of the main frame for vertical swinging adjustment is the frame 18 of an inclined conveyor having an endless conveying element 19 of such slatted or other form as to retain the potatoes while permitting dirt to sift therethrough onto the ground. A digging blade or plow share 20 is secured to the front end of the conveyor frame 18 in position to dig the potatoes from the ground and lift them with soil onto the forward end of the inclined conveyor. Journaled in the main frame above the forward end of the inclined conveyor is a transverse rock shaft 21 having end crank arms 22 connected to opposite sides of the forward end of the conveyor frame 18 by links 23, and secured on the rock shaft 21 is a hand lever 24 having a manually releasable latch mechanism 25 normally engaging a rack segment 26 suitably fixed to the main frame. By manipulating the lever 24, the forward end of the inclined conveyor and the digging blade 20 may be vertically adjusted to control the cutting depth of said blade. The adjustment is multiplied by adjusting the wheels 13 downwardly when the blade is raised, and vice versa, through the provision of link connections 27 between the forward end of the conveyor frame 18 and the downwardly directed ends 10 of the cross bar 9 of the front supporting truck.

Hinged at its rear end on the rear or head shaft 28 of the inclined conveyor is a frame 29 in the forward end of which is journaled a transverse horizontal drum for detaching the tops from the potatoes as they are dug from the ground by the blade 20 and delivered onto the inclined conveyor. This topping drum embodies end disks 30 connected near their peripheries by a circular series of spaced rock shafts 31 each having a series of curved outwardly projecting fingers 32 between which the potatoes may pass, and an inwardly projecting arm 33. The arms 33 of each pair of diametrically opposed rock shafts 31 are connected by a helical tension spring 34 so as to yieldingly hold the rock shafts positioned with their fingers 32 in radial outwardly projecting position. In this way, the fingers 32 will engage the tops and detach them from the potatoes when the drum is rotated in the direction of the arrow in Figure 3, carrying the tops upwardly and rearwardly and allowing any dirt to readily sift through the drum. At the same time, the springs 34 permit the fingers to yield or swing backwardly to readily pass obstructions, such as heavy clods of earth, without danger of causing damage to said teeth. A hand lever 35 is journaled on the rock shaft 21 and has a crank arm 36 connected by a link 37 with the forward end of the frame 29, and secured on the shaft 21 is a rack segment 38 engaged by the bolt of a latch mechanism 39 carried by the lever 35. The topping drum may be adjusted vertically by the lever 35 toward or from the forward end of the inclined conveyor to operate to the best advantage in accordance with the dictates of different conditions of use, such as different characters of soil, different sizes of potatoes, and the like. When the desired relation of the topping drum with the inclined conveyor has been secured, the blade 20 may be raised or lowered to control the depth of cut without disturbing this relation, it being evident that the topping drum will move with the blade 20, when the lever 24 is manipulated, because of the fact that the segment 38 is fixed on the rock shaft 21.

Mounted on the frame 29 directly behind the topping drum is a transverse inclined chute 40, and mounted on said frame at the forward side of the chute 40 is a roller 41. A series of endless belts 42 pass about the rock shafts 31 of the topping drum between the fingers 32, and about the roller 41, so as to convey the potato tops rearwardly from the top of said drum and deposit them into the chute 40. The chute 40 discharges the potato tops onto the ground at one side of the machine, as will be apparent from Figure 5. The levers 24 and 35 are in front of and within convenient reach of an operator's seat 43 mounted on the main frame above the chute 40.

One of the cross bars 6 is arranged adjacent the rear end of the inclined conveyor, and projecting rearwardly from this cross bar are a plurality of hook-shaped fingers 44 which form a foraminous trough into which the potatoes are discharged from said inclined conveyor and through which further dirt, loosened from the potatoes, may sift onto the ground.

Journaled in the side members 5 of the main frame above the axles 7 is a transverse shaft 45 upon which is secured a potato elevating and cleaning wheel embodying a pair of spaced relatively large side rings or flanges 46 connected at intervals by cross bars 47 and supported concentric with the shaft 45 by spokes 48 and hubs 49. Encircling the cross bars 47 and arranged in spaced side by side relation are a plurality of bands 50 forming a foraminous bottom for the channel between the flanges 46, through which still further dirt freed from the potatoes may sift. Projecting outwardly from each cross bar 47 between the bands 50 are a series of spaced hook-shaped fingers 51 arranged to pass between the trough-forming fingers 44 to engage the potatoes in the trough and carry them upwardly and rearwardly therefrom when the elevating and cleaning wheel is rotated in a counter-clockwise direction as viewed in Figure 3.

The inclined conveyor, the topping drum, and the elevating and cleaning wheel are all driven from the rear ground wheels 8 upon forward travel of the machine. For this purpose, a ratchet wheel 52 is secured to the hub of each wheel 8 as shown in Figure 9, and journaled on each stub shaft 7 is a spur gear 53 having a pair of pawls 54' engaging the teeth of the ratchet wheel 52. Each gear 53 meshes with a further gear 54 secured on the shaft 45, and the pawls and ratchet wheels are arranged so that the gears 53 are driven when the ground wheels 8 turn in a clockwise direction (Figures 3 and 9), but are allowed to idle when said ground wheels turn backwardly. This insures constant driving of the shaft 45 in one direction upon forward travel of the machine, and allows differential turning movement between the respective ground wheels 8, as in making turns. A sprocket chain 55 passes around sprocket wheels 56 and 57 provided respectively on the shaft 45 and the head shaft 28 of the inclined conveyor, so that the latter is driven whenever the elevating and cleaning wheel is driven. A further sprocket chain 58 passes about sprocket wheels 59 and 60 on the head shaft 28 and the shaft of the topping drum, so that the drive of the inclined conveyor is communicated to said drum. A suitable shield plate 61 is provided in front of the cleaning wheel at and rising from the rear side of the trough 40 to prevent the tops and trash delivered into the latter from being engaged by the fingers 51 of said cleaning wheel. Suitable guards 62 are also preferably mounted over the ground wheels 8.

Disposed at the rear of the cleaning wheel is an inclined platform onto which the potatoes are delivered from the cleaning wheel, and this platform preferably embodies a series of spaced parallel slats 63 which project between the fingers 51 to the bands 50 which are adapted to retain the potatoes as they pass rearwardly beyond the vertical plane intersecting the axis or shaft 45 of the cleaning wheel. The slats 63 thus positively lead the potatoes from the cleaning wheel and allow a final sifting of dirt from the potatoes for delivery in a clean state into suitably supported sacks 64 at the rear of the machine.

The main frame has a lower rear projecting part 65 supporting a platform 66 on which an attendant may stand to hand sacking of the potatoes as they roll down the platform composed of the slats 63.

Mounted across the rear lower end of the inclined slatted platform to receive the potatoes therefrom is an elongated hopper 67 having three spaced laterally swinging gates or switches 68 secured upon longitudinal horizontal rock shafts 69 at their lower ends. Arranged in side by side relation on the bottom of the hopper are four sack holders adapted to sustain the upper ends of a corresponding number of sacks in open position while resting upon the platform 66, and each embodying a horizontal U-shaped frame 70 (Figure 10) having forwardly projecting side legs terminating in pointed spurs 71 and provided with guide eyes 72 in which are slidably mounted the legs of a further U-shaped frame 73 having spurs 74 on the ends of its rear intermediate portion. The intermediate portion of each frame 73 has a central handle 75 by means of which said frame is slid forwardly to have the open end of the sack engaged with the spurs 71 and 74, and then slid rearwardly to stretch the mouth of the bag open to properly receive the potatoes from the hopper 67 without danger of accidental disengagement from said spurs. When the sack is filled, the gates 68 may be manipulated to divert the potatoes to another sack while the frame 73 of the holder for the filled sack is again slid forward to permit removal of said filled sack and substitution of an empty sack therefor. The gates 68 are arranged in the hopper 67 with the rock shafts 69 mounted between adjacent sack holders as shown in Figure 7, and the rear end of each rock shaft 69 has an operating handle 76. The gates 68 may thus be set to deliver the potatoes first to a certain sack or pair of sacks and then to another sack or pair of sacks, whereby one or two sacks may always be receiving potatoes while another filled sack or pair of sacks is or are being replaced by an empty sack or sacks. Mounted at each side of the hopper 67 is a horizontal elevated shelf 77 upon which empty sacks may be piled within convenient reach of the attendant standing on the platform 66.

In operation, the machine is drawn ahead so that the potatoes are plowed from the earth by the digging blade 20 and delivered thereby together with the tops, dirt and trash onto the forward end of the inclined conveyor 18, 19. The drum 30, etc., rotating directly over the front end of this conveyor, causes the fingers 32 to detach the tops from the potatoes and to carry them together with trash onto the belts 42, by which they are deposited into the chute 40 for delivery onto the ground at one side of the machine. The potatoes are carried rearwardly by the inclined conveyor and deposited into the trough formed by the fingers 44, from which they are lifted by the successive series of fingers 51 and carried upwardly and rearwardly by the cleaning wheel formed in part by the latter fingers. The potatoes are then delivered from the cleaning wheel and sacked as hereinbefore described, and due to the construction of the inclined conveyor, the trough formed by the fingers 44, the cleaning wheel, and the inclined platform formed by the slats 63, the dirt or earth will be completely detached and sifted from the potatoes so that they will be sacked in a substantially clean condition.

Minor changes may be made without departing from the spirit and scope of the invention as claimed.

What I claim is:

1. In a potato harvester, the combination of a wheeled frame, a plow carried thereby, an endless inclined conveyor carried by said frame adapted to receive the potatoes and dirt lifted by the plow and to deliver the same rearwardly, a horizontal drum carried by the frame and arranged above the forward end of the inclined conveyor to engage the tops of the potatoes and trash and elevate and deliver the same rearwardly, a transverse inclined chute carried by the frame above the inclined conveyor and rearwardly of said drum to receive the tops and trash from the latter and deliver it laterally onto the ground, and means to drive said conveyor and said drum, said drum comprising a series of peripherally arranged rock shafts having spaced outwardly projecting fingers, and tension springs yieldingly connecting said rock shafts in diametrically opposed pairs to permit yielding of the fingers upon engaging an obstruction, a roller journaled on the frame at the forward side of said chute and rearwardly of said drum, and a plurality of endless belts extending about said roller and about the rock shaft between said fingers for delivering the potato tops and trash into said chute from the top of said drum.

2. A potato harvester comprising a main frame, traction wheels for the same, an inclined conveyor frame pivotally connected at its rear end to said main frame, an endless conveyor mounted in said conveyor frame, a plow carried by the forward end of said conveyor frame, a swivel truck supporting the forward end of said main frame, means connecting the forward end of said conveyor frame to said swivel truck, hand operable means for raising and lowering the forward end of said conveyor frame to gauge the digging depth of said plow, a topping drum supported above the forward end of said conveyor, hand operable means for adjusting said drum with respect to said conveyor and plow, a transverse inclined chute arranged above the conveyor and rearwardly of said topping drum, a relatively large cleaning wheel mounted in said main frame rearwardly of the said inclined chute and conveyor, means for simultaneously transmitting driving power from said traction wheels to said endless conveyor, topping drum and cleaning wheel, and a hopper mounted at the rear of said cleaning wheel adapted to receive the potatoes from the cleaning wheel.

3. In a potato harvester, the combination of a wheeled frame, an inclined conveyor frame having its rear end pivoted to said wheeled frame, an inclined endless conveyor mounted in said conveyor frame, a plow carried by the forward end of said conveyor frame, a drum frame adjustably mounted above said endless conveyor, a topping drum revolubly mounted in said drum frame above the forward end of said endless conveyor, a shaft arranged transversely and in rear of said topping drum, endless conveyor belts connected around said topping drum and said shaft, a chute arranged transversely of said wheeled frame in rear of said conveyor belts, hand operable means for adjusting said topping drum with respect to said endless conveyor, and hand operable means for vertically adjusting the forward end of said endless conveyor and said topping drum while in fixed adjusted relation to each other.

In testimony whereof I affix my signature.

DAVID A. RICE.